B2

United States Patent
Roberts et al.

(10) Patent No.: US 11,847,492 B2
(45) Date of Patent: *Dec. 19, 2023

(54) CONTROLLING SCHEDULING OF A GPU

(71) Applicant: Imagination Technologies Limited, Kings Langley (GB)

(72) Inventors: Dave Roberts, Saratoga, CA (US); Jackson Dsouza, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 652 days.

This patent is subject to a terminal disclaimer.

(21) Appl. No.: 16/063,518

(22) PCT Filed: Dec. 9, 2016

(86) PCT No.: PCT/GB2016/053876
§ 371 (c)(1),
(2) Date: Jun. 18, 2018

(87) PCT Pub. No.: WO2017/103573
PCT Pub. Date: Jun. 22, 2017

(65) Prior Publication Data
US 2018/0365062 A1    Dec. 20, 2018

(30) Foreign Application Priority Data
Dec. 18, 2015 (GB) .................................. 1522461

(51) Int. Cl.
*G06F 9/48* (2006.01)
*G06T 1/20* (2006.01)

(52) U.S. Cl.
CPC .......... *G06F 9/4887* (2013.01); *G06F 9/4881* (2013.01); *G06T 1/20* (2013.01); *Y02D 10/00* (2018.01)

(58) Field of Classification Search
CPC ....... G06F 9/4887; G06F 9/4881; G06T 1/20; Y02D 10/00
See application file for complete search history.

(56) References Cited

U.S. PATENT DOCUMENTS

2005/0132167 A1*  6/2005  Longobardi .......... G06F 9/5083
                                                   712/201
2008/0021679 A1*  1/2008  Bleiweiss ............... A63F 13/00
                                                   703/2
(Continued)

FOREIGN PATENT DOCUMENTS

EP    1 137 226 A2    9/2001
EP    2791910 A1    10/2014
(Continued)

OTHER PUBLICATIONS

IBM Technical Disclosure NN72033033. Preemptive Dispatching Algorithms. (Year: 1972).*

(Continued)

*Primary Examiner* — Emerson C Puente
*Assistant Examiner* — Jonathan R Labud
(74) *Attorney, Agent, or Firm* — Potomac Law Group, PLLC; Vincent M DeLuca

(57) ABSTRACT

The operation of a GPU is controlled based on one or more deadlines by which one or more GPU tasks must be completed and estimates of the time required to complete the execution of a first GPU task (which is currently being executed) and the time required to execute one or more other GPU tasks (which are not currently being executed). Based on a comparison between the deadline(s) and the estimates, context switching may or may not be triggered.

20 Claims, 6 Drawing Sheets

(56) References Cited

U.S. PATENT DOCUMENTS

| | | |
|---|---|---|
| 2011/0099404 A1 | 4/2011 | Hartmann et al. |
| 2011/0173478 A1 | 7/2011 | Li et al. |
| 2014/0022263 A1 | 1/2014 | Hartog et al. |
| 2014/0089694 A1 | 3/2014 | Culbert |
| 2014/0184619 A1 | 7/2014 | Kim |
| 2016/0358305 A1* | 12/2016 | Banerjee .................. G06T 1/20 |

FOREIGN PATENT DOCUMENTS

| | | |
|---|---|---|
| FR | 2 923 039 A1 | 5/2009 |
| GB | 2 403 823 A | 1/2005 |
| WO | 2013/089989 A1 | 6/2013 |

OTHER PUBLICATIONS

Oh et al; "A Modified Least-Laxity-First Scheduling Alogrithm for Real-Time Tasks"; Proceedings of the Fifth International Conference on Real-Time Computing Systems and Applications, 1998, IEEE, Hiroshima, 1998; pp. 31-36.

Kim et al; "Preemption-Aware Dynamic Voltage Scaling in Hard Real-Time Systems"; Proceedings of the 2004 International Symposium on Low Power Electronics and Design, ISPLED '04; 2004; pp. 393-398.

Kim et al., "Preemption-Aware Dynamic Voltage Scaling In Hard Real-Time Systems", Proceedings of the 2004 International Symposium on Low Power Electronics and Design, 2004, published 2004, IEEE, pp. 393-398.

Oh et al., "A Modified Least-Laxity-First Scheduling Algorithm for Real-Time Tasks", Proceedings of the Fifth International Conference on Real-Time Computing Systems and Applications, 1998, published 1998, IEEE, pp. 31-36.

Combined search and examination report issued on the corresponding GB 1522461.1, dated Jun. 17, 2016.

Audsley et al; "Mechanisms for enhancing the flexibility and utility of hard real-time systems"; Real-Time Systems Symposium; Dec. 7, 1994; pp. 12-21.

Membarth et al; "Dynamic Task-Scheduling and Resource Management for GPU Accelerators in Medical Imaging"; Architecture of Computing Systems; Jan. 1, 2012; pp. 147-159.

* cited by examiner

CONTROLLING SCHEDULING OF A GPU

BACKGROUND

Graphics processor units (GPUs) are processors which have a highly parallel structure and which are typically used for graphics operations such as texture mapping and rendering polygons. GPUs (which may also be referred to as VPUs) may also be used for non-graphical applications, e.g. to perform data-parallel computing. A GPU may run several processes and a scheduling system within the GPU selects which process to run next. Typically the scheduling is performed based on synchronization (i.e. running tasks in an order determined by their interdependencies) and priority (i.e. running higher priority tasks before lower priority tasks). If context switching is enabled, a higher priority task (e.g. a rendering task associated with a user interaction) will interrupt a lower priority task (e.g. rendering of live wallpaper) once the higher priority task is able to be run (i.e. it is not blocked by synchronization).

The embodiments described below are provided by way of example only and are not limiting of implementations which solve any or all of the disadvantages of known methods of controlling scheduling within a GPU.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The operation of a GPU is controlled based on one or more deadlines by which one or more GPU tasks must be completed and estimates of the time required to complete the execution of a first GPU task (which is currently being executed) and the time required to execute one or more other GPU tasks (which are not currently being executed). Based on a comparison between the deadline(s) and the estimates, context switching may or may not be triggered.

A first aspect provides a method of scheduling tasks within a GPU, the method comprising: whilst executing a first GPU task and in response to a second GPU task becoming ready to run, determining which of the first and second GPU task has a higher priority; and in response to determining that the second GPU task has a higher priority than the currently executing first GPU task: estimating a completion time for each of the first and second GPU tasks; determining, using the estimated completion times, whether both the first and second GPU tasks can be completed before a deadline associated with the second GPU task; and in response to determining that both the first and second GPU tasks can be completed before the deadline associated with the second GPU task, allowing the first GPU task to continue execution.

A second aspect provides a graphics processor unit (GPU) comprising a microcontroller, wherein the microcontroller is configured: whilst executing a first GPU task and in response to a second GPU task becoming ready to run, to determine which of the first and second GPU task has a higher priority; and in response to determining that the second GPU task has a higher priority than the currently executing first GPU task, to: estimate a completion time for each of the first and second GPU tasks; determine, using the estimated completion times, whether both the first and second GPU tasks can be completed before a deadline associated with the second GPU task; and in response to determining that both the first and second GPU tasks can be completed before the deadline associated with the second GPU task, to allow the first GPU task to continue execution.

Further aspects provide, a GPU as described embodied in hardware on an integrated circuit, computer readable code adapted to perform the steps of the method as described herein when the code is run on a computer (and where this code may be encoded on a computer readable storage medium), a method of manufacturing, at an integrated circuit manufacturing system, a GPU as described herein, an integrated circuit definition dataset that, when processed in an integrated circuit manufacturing system, configures the system to manufacture a GPU as described herein and a computer readable storage medium having stored thereon an integrated circuit definition dataset that, when processed in an integrated circuit manufacturing system, configures the system to manufacture a GPU as described herein.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
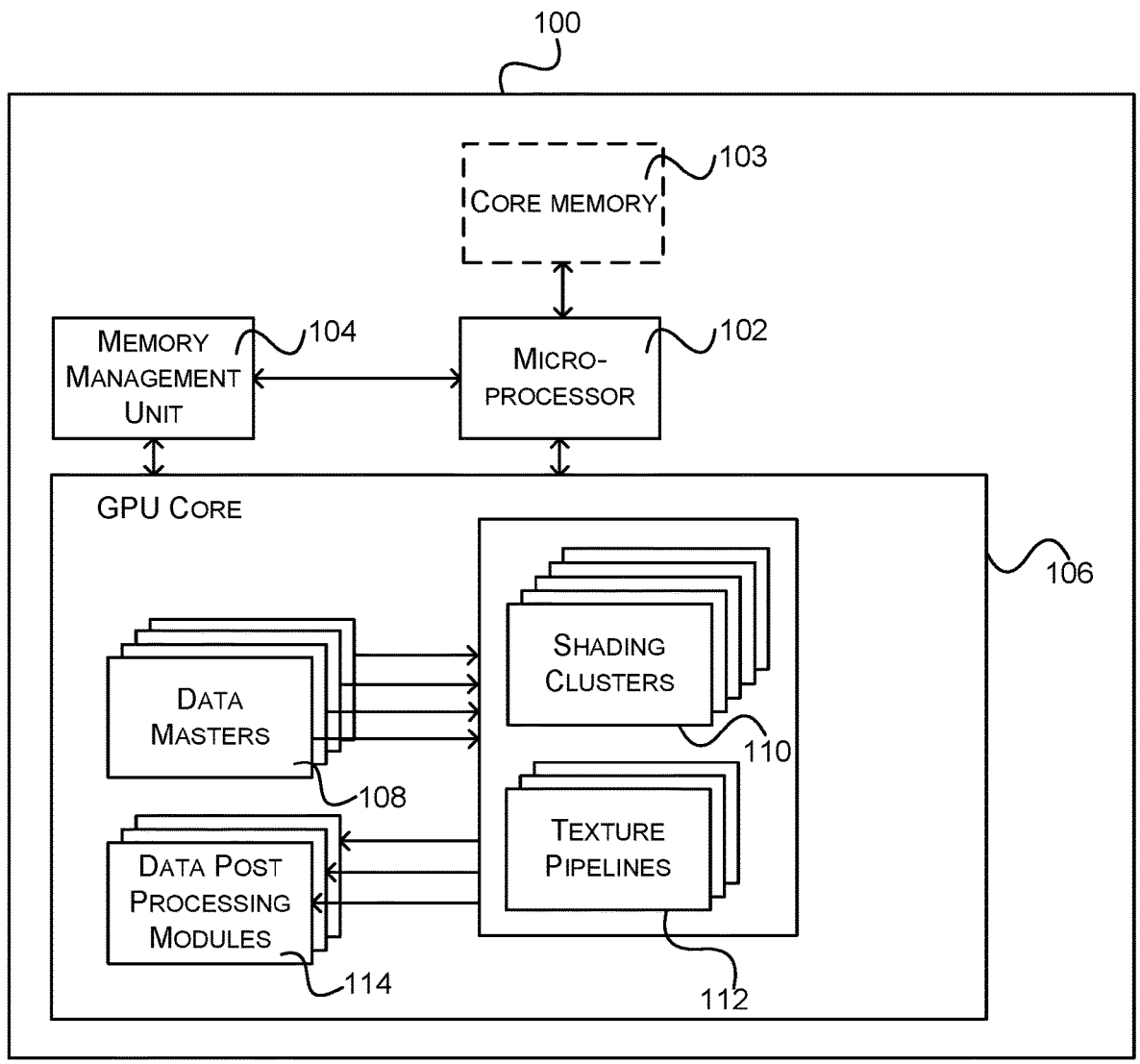
FIG. 1 is a schematic diagram of an example GPU in which the methods described herein may be implemented.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Methods of controlling the operation of a GPU are described herein. The methods use stored statistics relating to the time taken to perform GPU tasks (e.g. rendering tasks or compute tasks) to determine an estimated time to complete each of a plurality of tasks and then the estimated times are compared to one or more task deadlines. The operation of the GPU is then modified dependent upon whether the task deadline(s) will be met or not. As described below, the modification to the operation of the GPU may affect the scheduling of tasks, and more specifically whether a lower priority task is interrupted (via a context switch) to perform a high priority task or not. In addition, or instead, the modification to the operation of the GPU may affect the operating point (e.g. operating voltage and frequency) of the GPU (e.g. using dynamic voltage and frequency scaling, DVFS).

If the methods described herein are used to influence the scheduling of tasks within a GPU, the number of context switches which are performed can be reduced whilst not impairing the user experience, and this increases the efficiency of the GPU. Switching tasks on a GPU (by context switching) is particularly costly (in terms of efficiency and also memory bandwidth and scheduler performance to a lesser degree) because the pipelines are deeper (i.e. they comprise more stages than pipelines within a CPU) and there are a large number of caches storing a large amount of data which must be flushed. In such implementations, two tasks are considered—the task that is currently executing and a newly runnable and higher priority task—and so two estimates are generated and compared to a task deadline for the higher priority task.

If the methods described herein are used to control the operating point of the GPU, the target performance of the GPU can be met whilst optimizing the power consumption (and amount of heat generated). For example, the operating point can be set to one with a lower power consumption unless the increased operating speed (i.e. increased clock speed) is required to be able to schedule the tasks to meet the task deadlines. In such implementations, all the tasks which are being performed by the GPU within a time window are considered, where this time window may cover all the tasks currently in the queue. The time window may alternatively be defined in different ways, for example the window may run until (i.e. end at) the next deadline on a timeline (e.g. an ordered list) of deadlines (e.g. the next display refresh or the following refresh if the next display refresh is very close in time). In various examples, where there are multiple different workloads (where a workload may be a task, sub-task, or a group of tasks) in the GPU queue targeting different deadlines (where these deadlines may be display refreshes) and the time window extends to cover all the workloads currently in the queue, the operating point may be controlled such that each task can meet its own respective deadline.

FIG. 1 is a schematic diagram of an example GPU 100 in which the methods described herein may be implemented. The GPU 100 comprises an embedded microprocessor 102 which runs software or firmware which implements the methods described herein. This software/firmware may be stored in external memory (i.e. outside the GPU 100, accessed via a memory management unit 104) or in core memory 103 within the GPU. The statistics which are used in the methods described herein may be stored within the GPU 100 (e.g. in core memory 103) or may be stored externally to the GPU and accessed via the memory management unit (MMU) 104 within the GPU (and which may be referred to as the 'GPU MMU' to distinguish it from MMUs external to the GPU e.g. a CPU MMU and/or system MMU). The GPU 100 further comprises the GPU core 106 which comprises the data masters 108, shading clusters 110, texture pipelines 112 and data post-processing modules 114 which perform the GPU tasks.

It will be appreciated that other GPUs may not comprise all the functional elements shown in FIG. 1 (i.e. one or more of the functional elements shown in FIG. 1 may be omitted) and may, in some examples, comprise additional functional elements not shown in FIG. 1 (e.g. an interface to a power management IC).

Figure 2:
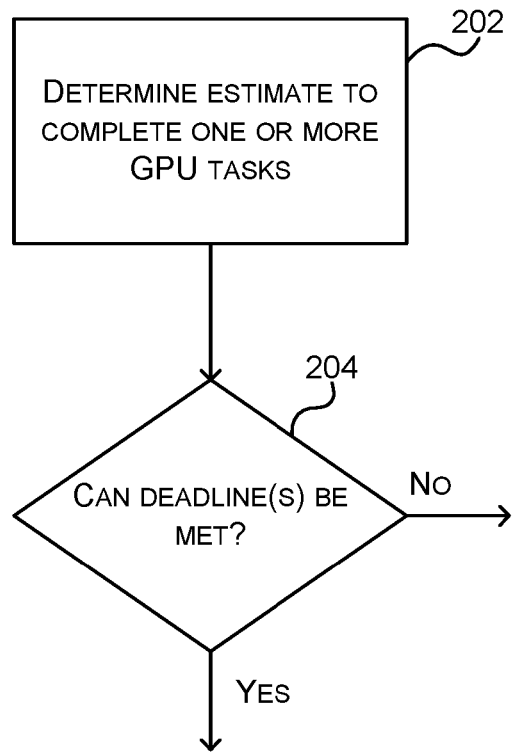
FIG. 2 is a flow diagram of a first example method of controlling the operation of a GPU.

FIG. 2 is a flow diagram of an example method of controlling the operation of a GPU (such as the one shown in FIG. 1) which may be implemented in software/firmware run by a microprocessor 102 within the GPU 100. The method comprises determining the estimates to complete each of one or more GPU tasks (block 202) or, in various examples, determining estimates to complete each of two or more GPU tasks where at least one of the tasks is currently running. The estimate which is determined (in block 202) may be in terms of time (e.g. X milliseconds) or GPU cycles (e.g. Y cycles). The GPU tasks may be render tasks, compute tasks or other types of tasks being performed on the GPU and in some examples where estimates are determined for two or more GPU tasks, the two or more GPU tasks may be of the same type (e.g. two render tasks) or may be of different types. Having determined the estimate(s) (in block 202), these are compared to one or more deadlines to determine if the deadline(s) can be met (block 204). Depending upon the outcome of this determination (in block 204), the operation of the GPU may be modified and this is described below with reference to a number of examples.

Another example method of controlling the operation of a GPU in which the determination (in block 202) is used to affect the scheduling of GPU tasks can be described with reference to the flow diagram in FIG. 3. Whilst the GPU is executing a first GPU task (block 302), a second GPU task becomes runnable (block 304), where the term 'runnable' is used to refer to a situation where the task is no longer blocked due to synchronization (i.e. any tasks upon which the second GPU task depends have been completed). Both the first and second GPU tasks have an associated priority which may be explicitly defined (e.g. specified by an application) or a consequence of the type of task (e.g. rendering of live wallpaper is inherently lower priority than a compositor maintaining a fixed frame rate, and rendering of updates to a navigation system is inherently lower priority than an automotive digital dashboard) and in various examples these tasks may be render tasks or compute tasks.

In accordance with conventional scheduling algorithms, if the second GPU task has a priority which is lower than the currently executing first GPU task ('No' in block 306), the first GPU task is allowed to complete (block 308) before the second GPU task is executed (block 310). Also, in the event that a third GPU task becomes runnable before the first GPU task has completed, the relative priorities of the first and third GPU tasks are compared (in an operation analogous to block 306) and so it may be that the second GPU task is not executed after the first GPU task as the first task may be interrupted to run the third GPU task. Furthermore, having completed the first GPU task (in block 308) if the third GPU task has a priority which is lower than the first GPU task but higher than the second GPU task, it may be the third GPU task that is executed next.

If, however, the second GPU task, which becomes ready to run during the execution of the first GPU task (block 304) has a priority which is higher than the first GPU task ('Yes' in block 306), then according to conventional scheduling algorithms, a context switch would occur which switches out the execution of the first GPU task and instead executes the second GPU task. In contrast, in the method shown in FIG. 3, this context switch does not automatically occur but instead an assessment is made as to whether the first GPU task can be allowed to complete. This may avoid unnecessary context switching and as a result, improve the efficiency of the GPU.

The assessment which is made comprises estimating a time to complete each of the first and second GPU tasks (block 312) and then comparing these estimates to a deadline for completing the second (higher priority) GPU task (block 314). The estimates may be generated (in block 312)

in terms of time (e.g. X milliseconds) or GPU cycles (e.g. Y cycles) and may be generated using stored statistics for GPU tasks or sub-tasks (e.g. based on a stored statistical model for GPU tasks).

Figure 3:
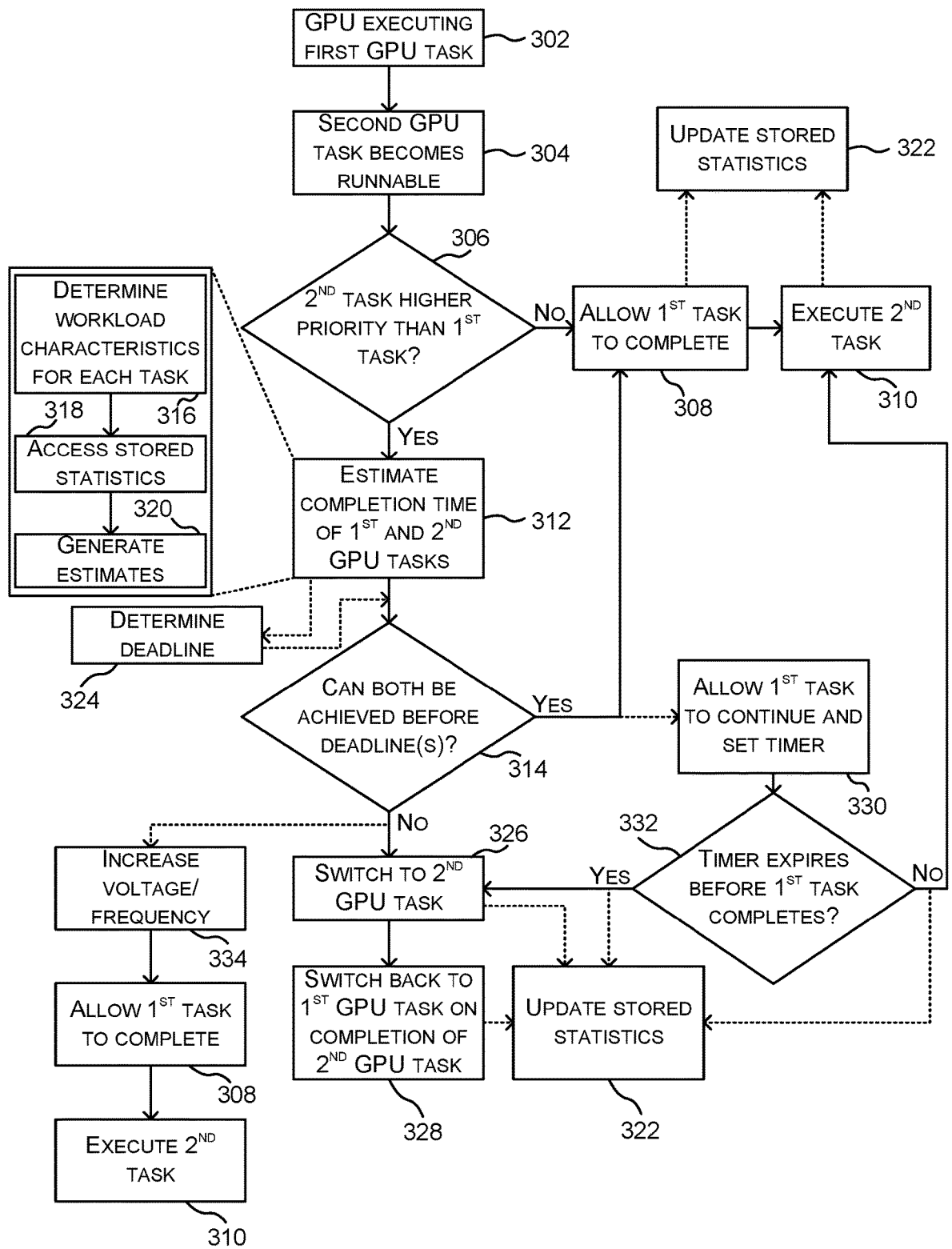
FIG. 3 is a flow diagram of a second example method of controlling the operation of a GPU.

As shown in FIG. 3, in various examples, the estimates may be determined (in block 312) by determining workload characteristics for each of the first and second GPU tasks (block 316). The workload characteristics are dependent on the type of GPU task concerned and various examples may include one or more of: the render target size, the number of translucent objects, the profile of all shaders, the shader lengths and the number of primitives. Having determined the workload characteristics for each task (in block 316), stored statistics for each identified characteristic are accessed (block 318) and these accessed statistics for the characteristics of each task are then used to generate the two estimates, one for each of the first and second GPU tasks (block 320). As the characteristics are not specific to a particular GPU task, statistics may exist even before the GPU task has first been executed (e.g. they may be generated before a task enters the queue based on analysis of the GPU task) and these statistics may subsequently be updated following the execution of a GPU task (block 322).

In various examples, the workload characteristics may be described in terms of a workload footprint, with each workload (e.g. each render) having a calculated footprint. If a new workload has a footprint which is the same as (or in some examples, similar to) another workload which has already completed execution on the GPU, then the estimate for the new task may be set to the same cycle count (i.e. the same number of cycles) as the executed workload took.

If the GPU tasks are render tasks, a single render task may comprise many sub-tasks, where each sub-task corresponds to smaller granular units that can be initiated on the GPU. For example, a single render task may comprise many render commands (e.g. 100 render commands) and so the estimate may be generated by evaluating the stored statistics using characteristics of each of the individual render commands. These individual commands may be considered to be 'children' of a parent render target which corresponds to the render task. In an example, a single render may be a collection of N vertex DM (data master) workloads and M pixel DM workloads, where in many cases, M=1. Each of these workloads may correspond to a sub-task.

Figure 4:
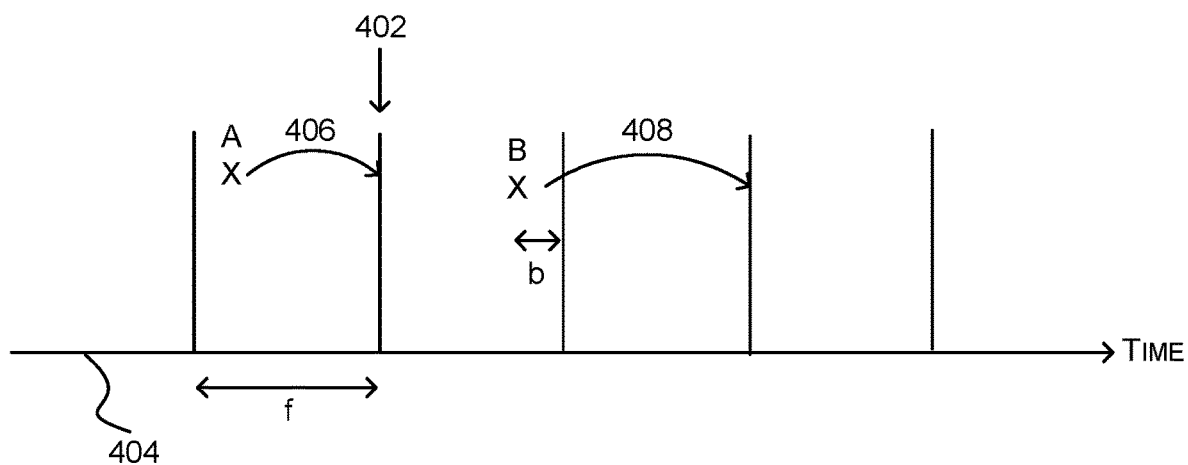
FIG. 4 is a schematic diagram of a timeline showing the periodic display refresh points.

The generated estimates (from block 312) are compared to a deadline for the higher priority (second) GPU task (in block 314). The deadline may be explicitly defined (e.g. provided to the GPU by the platform software, an application or user interface) or may be determined by the microprocessor (block 324). Where the second GPU task is a render (or other graphics centric) task, the deadline may be inferred (in block 324) based on the display refresh points for the display, which for a 60 fps (frames per second) display are every 16.66 ms, as shown graphically in FIG. 4. In FIG. 4, the display refresh points are indicated by vertical lines 402 on the timeline 404 separated by a time interval, f. If the second GPU task becomes runnable at a point A, the deadline (which is used in block 314) may be the next display refresh point (as indicated by arrow 406), such that the deadline will never be more than f in the future (where f is the temporal spacing of the display refresh points, e.g. f=16.66 ms). In some examples, however, there may be a minimum deadline value, d, such that if the second GPU task becomes runnable at a point B, where the time, b, before the next display refresh point is less than the threshold (b<d), the deadline is set to the following display refresh point (as indicated by arrow 408). In this example, the deadline will never be more than f+d or less than d.

In some examples, whilst the display may run at a particular frame rate (e.g. 60 fps), an application may run at a lower refresh rate in which case the deadline for a render for the application may be defined with respect to the refresh rate of the application and not the refresh rate of the display.

In some examples, the deadline may be set for some GPU tasks, not based upon the refresh rate but upon an acceptable latency as experienced by a user. For some applications, a larger latency may be acceptable (e.g. a calendar or clock application) than for other applications (e.g. a video streaming application or a game with complex graphics). For a non-graphics task, the deadline may, for example, be provided by the application.

Having determined both the estimates (in block 312) they are compared to the deadline (in block 314) to determine whether both tasks (i.e. both the first and second GPU tasks) can be completed prior to the deadline for the second GPU task. If both tasks can be completed before the deadline ('Yes' in block 314), no context switch occurs and the first GPU task is allowed to complete (block 308) before the second GPU task is executed (block 310). This eliminates what would otherwise be an unnecessary context switch to switch from the first task to the second task and then back to the first task once the second task was complete. If, however, both tasks cannot be completed before the deadline ('No' in block 314), a context switch does occur (which interrupts the execution of the first GPU task) and the second GPU tasks is executed (block 326). Upon completion of the second (higher priority) GPU task (and provided a further higher priority GPU task has not become runnable) a second context switch occurs so that the first GPU task can be completed (block 328).

As the determination is made (in block 314) based on estimates, there may be times where these estimates are inaccurate. In some implementations, such as real-time systems where deadlines cannot be missed (e.g. for an automotive digital dashboard), a timer may be used to ensure that in the event that the lower priority first GPU task is allowed to continue, its execution does not overrun to the point that the second GPU task cannot meet its deadline. As shown in FIG. 3, if it is determined that both tasks can be executed before the deadline ('Yes' in block 314) a timer may be set in parallel with allowing the first GPU task to continue to execute (block 330). If the deadline for the second GPU task is D and the estimate to complete the second task is E, the timer may be set to a time given by D−E, D−(E+C) where C is the time taken to perform the context switch from the first task to the second task, or D−(E+C+M) where M is an extra error margin (e.g. in case the estimate for the second GPU task is inaccurate).

If the first task completes before the timer expires ('No' in block 332), then the second GPU task can be executed following the completion of the first GPU task. If, however, the timer expires before the first task completes ('Yes' in block 332), a context switch is performed (in block 326) so that the second GPU task can be completed to meet the deadline before switching back to the first GPU task (block 328), presuming that no higher priority GPU task has become runnable in the interim which might prevent the completion of the first GPU task. Using a timer in this way means that even if the lower priority GPU task takes longer than predicted (by the estimate), it can still be interrupted and the system is no less efficient than one using a conventional scheduler based on priority.

As shown in FIG. 3, where stored statistics are used to generate the estimates (in block 312), these may be updated at one or more points in the methods based on the actual execution times for the first and/or second GPU tasks or for their sub-tasks (block 322).

In a variation of the method shown in FIG. 3, instead of context switching to ensure that a deadline can be met (e.g. in block 326) the operating point of the GPU may be adjusted (block 334 e.g. using DVFS) to ensure the deadline for the second (higher priority) GPU task can be met. By increasing the voltage/frequency, the estimates (from block 312), if defined in terms of GPU cycles, do not change but the length (in terms of time) of a GPU cycle is reduced so that the estimates, in terms of time, are reduced.

The methods shown in FIG. 3 add flexibility to conventional priority based scheduling and this improves the efficiency of the GPU by reducing the number of context switches which are performed. As described above, a context switch on a GPU may be particularly costly (in terms of time and hence efficiency) due to the depth of pipelines and number of caches which increases the time taken to perform the store and load operations of a context switch.

Although the operating point of the GPU may be changed as a result of computing estimates for just one or two GPU tasks (as described above), in other examples the operating point may be changed based on an assessment of all the GPU tasks which are queued and/or which need to be executed within a particular time window, as can be described with reference to FIG. 5.

Figure 5:
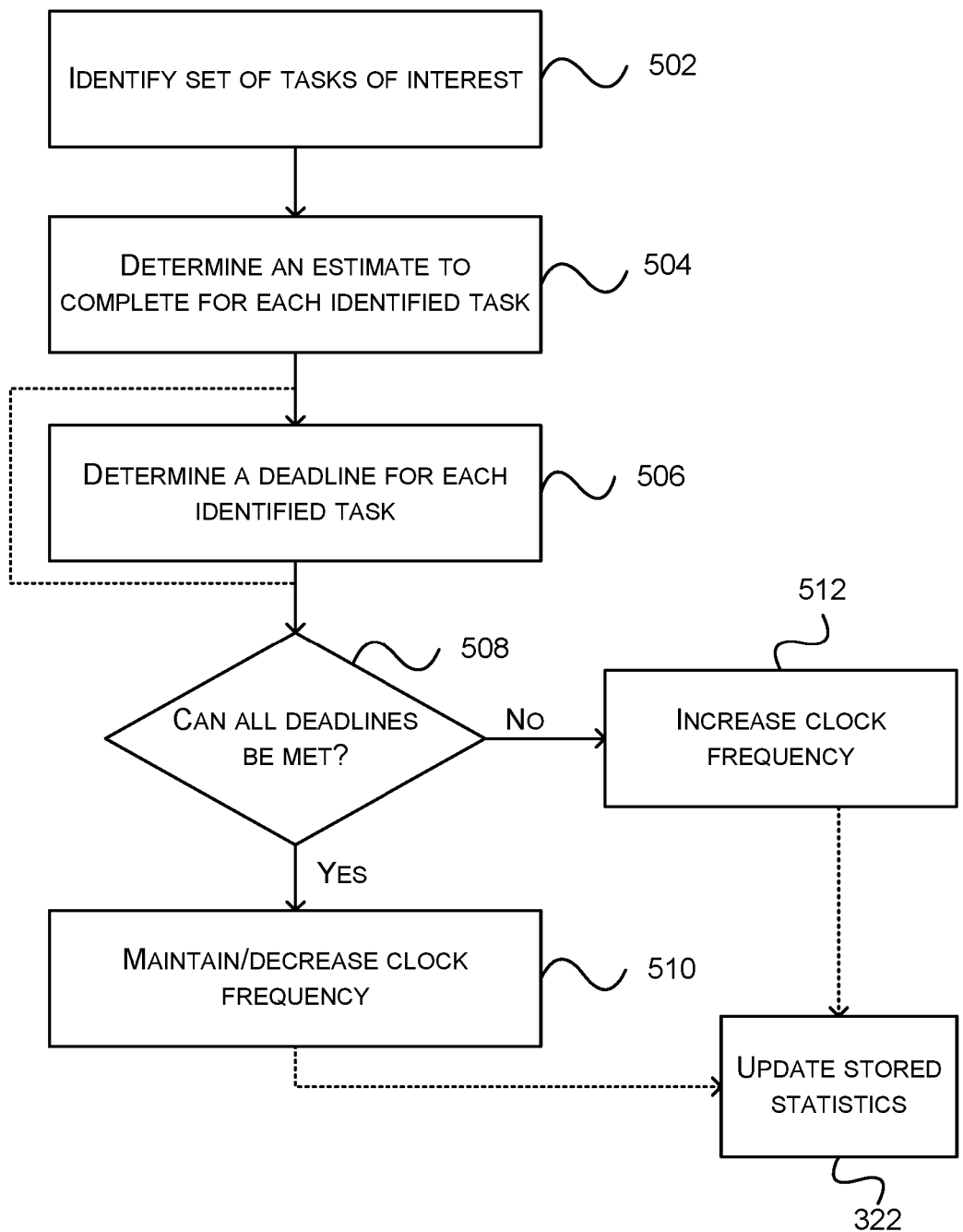
FIG. 5 is a flow diagram of a third example method of controlling the operation of a GPU.

As shown in FIG. 5, a set of GPU tasks are identified (block 502). This set of GPU tasks may be all the queued tasks in the system, all the tasks in a defined time window or the set may be defined in another way (e.g. key renders that contribute to pixels drawn by the compositor on the next frame to be displayed). An estimate to complete each of the identified tasks is then identified (block 504) and these estimates may be generated as described above with reference to block 312 (e.g. using workload characteristics and stored statistics). Where the deadlines are not explicitly defined (e.g. by the platform software, an application or user interface), a deadline may be determined, by the microprocessor, for each identified task (block 506), and the deadlines may be determined using similar methods to those described above with reference to FIGS. 3 and 4 (e.g. to be the next display refresh event). In various examples, tasks may be grouped based on their deadline, e.g. there may be one group of tasks targeting deadline D1 and another targeting deadline D2, where D2>D1.

Having determined the estimates (in block 504) and deadlines (in block 506), it is determined whether all the deadlines for all the identified GPU tasks can be met (block 508). If all the deadlines can be met with the current operating point ('Yes' in block 508), the clock frequency of the GPU may be maintained (i.e. left unchanged), or in some cases decreased (block 510). If, however, all the deadlines cannot be met with the current operating point ('No' in block 508), the clock frequency of the GPU may be increased (block 512), e.g. using DVFS, so that the deadlines can be met. If a maximum clock frequency is reached, it may not be possible to further increase the frequency to a point where all the deadlines can be met; however, use of the maximum frequency will ensure that as many deadlines as possible will be met.

Whilst FIG. 5 shows the changing of the clock frequency (in blocks 510 and 512) based on whether deadlines can or cannot be met, alternatively (or in addition) the operating voltage/frequency may be changed (e.g. in blocks 510 and 512 or equivalent blocks), where the frequency is changed as a consequence of changing the operating voltage. In the event that the voltage/frequency is adjusted, the GPU may comprise an interface to a power management IC (PMIC, not shown in FIG. 1) or alternatively a request may be sent to a CPU in communication with the GPU and the CPU handles (and implements) the request (e.g. using a driver running on the CPU).

Although the methods of FIGS. 3 and 5 are described separately, a GPU may implement both (or parts of both) methods. The methods may be used by a GPU to independently control both DVFS and scheduling.

The determination of the estimates (in block 202 of FIG. 2, block 312 of FIG. 3 and block 504 of FIG. 5) may involve computing those estimates based on stored statistics or alternatively, the determination of the estimates, using stored statistics for tasks and sub-tasks, may be performed on a CPU which is in communication with the GPU.

The methods described above may be used in systems with at least one process with a real-time or other time-critical requirement. Examples include an automotive digital dashboard and a compositor running a fixed frame rate (e.g. 60 fps) output. The system may also run less time sensitive processes such as navigation system updates and live wall-paper updates.

A GPU which implements the methods described above may be used in many different devices. For example, within a computing device for a vehicle, within a handheld computing device (e.g. a tablet or smart phone), within another consumer appliance (e.g. a digital television or set-top box) or any other computing device (e.g. a laptop, desktop computer, smart watch, etc.).

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein. For example, a non-transitory computer readable storage medium may have stored thereon computer readable instructions that, when processed at a computer system for generating a manifestation of an integrated circuit, cause the computer system to generate a manifestation of a processor of a receiver as described in the examples herein or to generate a manifestation of a processor configured to perform a method as described in the examples herein. The manifestation of a processor could be the processor itself, or a representation of the processor (e.g. a mask) which can be used to generate the processor.

An example of processing an integrated circuit definition dataset at an integrated circuit manufacturing system so as to configure the system to manufacture a GPU will now be described with respect to FIG. 6.

Figure 6:
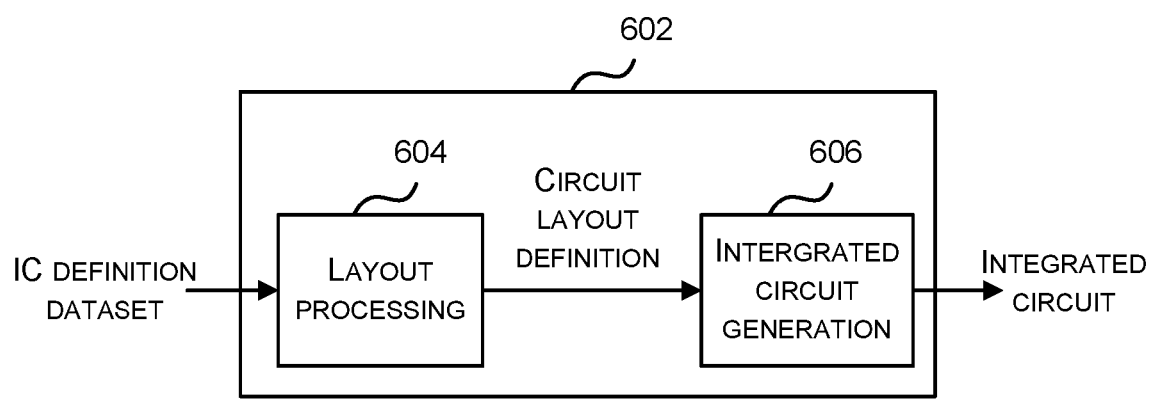
FIG. 6 is a schematic diagram of an example integrated circuit manufacturing system.

FIG. 6 shows an example of an integrated circuit (IC) manufacturing system 602 which comprises a layout processing system 604 and an integrated circuit generation system 606. The IC manufacturing system 602 is configured to receive an IC definition dataset (e.g. defining a GPU as described in any of the examples herein), process the IC definition dataset, and generate an IC according to the IC definition dataset (e.g. which embodies a GPU as described in any of the examples herein). The processing of the IC definition dataset configures the IC manufacturing system 602 to manufacture an integrated circuit embodying a GPU as described in any of the examples herein. More specifically, the layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 606. The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC. The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a GPU without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some examples, an integrated circuit definition dataset could include software which runs on hardware defined by the dataset or in combination with hardware defined by the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of scheduling tasks within a GPU, the method comprising:
   whilst executing a first GPU task and in response to a second GPU task becoming ready to run, determining which of the first and second GPU task has a higher priority; and
   in response to determining that the second GPU task has a higher priority than the currently executing first GPU task:
   estimating a completion time for each of the first and second GPU tasks;
   determining, using the estimated completion times, whether both the first and second GPU tasks can be completed before a deadline associated with the second GPU task;
   in response to determining that both the first and second GPU tasks can be completed before the deadline associated with the second GPU task, allowing the first GPU task to continue execution and setting a timer to a time given by D−(E+C), wherein D is the deadline for the second GPU task, E is the estimated time to complete the second GPU task, and C is the time taken to perform a context switch from the first GPU task to the second GPU task; and
   in response to the timer expiring prior to completion of execution of the first GPU task, interrupting the execution of the first GPU task and executing the second GPU task.

2. The method according to claim 1, further comprising:
   in response to determining that both the first and second GPU tasks cannot be completed before the deadline associated with the second GPU task, interrupting the execution of the first GPU task and executing the second GPU task.

3. The method according to claim 1, wherein allowing the first GPU task to continue execution comprises:
   allowing execution of the first task to complete.

4. The method according to claim 1, further comprising:
   in response to determining that both the first and second GPU tasks cannot be completed before the deadline associated with the second GPU task, increasing an operating frequency of the GPU and allowing the first GPU task to continue execution before executing the second GPU task.

5. The method according to claim 1, further comprising:
   determining the deadline associated with the second GPU task.

6. The method according to claim 5, wherein the deadline associated with the second GPU task is determined based on a display refresh rate.

7. The method according to claim 1, further comprising:
   updating stored statistics associated with the first and/or second GPU task.

8. The method according to claim 1, wherein the first and second GPU tasks are graphics tasks.

9. The method according to claim 1, wherein the GPU comprises a microcontroller.

10. The method according to claim 1, wherein estimating a completion time for each of the first and second GPU tasks comprises, for each GPU task:
    identifying one or more workload characteristics of the GPU task;
    accessing stored statistics for each identified workload characteristic; and
    generating an estimated completion time for the GPU task using the stored statistics for identified workload characteristics.

11. A GPU comprising a microcontroller, wherein the microcontroller is configured:
    whilst executing a first GPU task and in response to a second GPU task becoming ready to run, to determine which of the first and second GPU task has a higher priority; and in response to determining that the second GPU task has a higher priority than the currently executing first GPU task, to:
   estimate a completion time for each of the first and second GPU tasks;
   determine, using the estimated completion times, whether both the first and second GPU tasks can be completed before a deadline associated with the second GPU task;
   in response to determining that both the first and second GPU tasks can be completed before the deadline associated with the second GPU task, to allow the first GPU task to continue execution, and to set a timer to a time given by D−(E+C), wherein D is the deadline for the second GPU task, E is the estimated time to complete the second GPU task, and C is the time taken to perform a context switch from the first GPU task to the second GPU task; and
   in response to the timer expiring prior to completion of execution of the first GPU task, to interrupt the execution of the first GPU task and execute the second GPU task.

12. The GPU according to claim 11, further comprising a memory arranged to store device executable instructions which, when executed, cause the microcontroller:
   while executing the first GPU task and in response to the second GPU task becoming ready to run, to determine which of the first and second GPU task has a higher priority; and
   in response to determining that the second GPU task has a higher priority than the currently executing first GPU task, to:
     estimate said completion time for each of the first and second GPU tasks;
     determine, using the estimated completion times, whether both the first and second GPU tasks can be completed before said deadline associated with the second GPU task; and
     in response to determining that both the first and second GPU tasks can be completed before the deadline associated with the second GPU task, to allow the first GPU task to continue execution.

13. The GPU according to claim 11, wherein the microcontroller is further configured, in response to determining that both the first and second GPU tasks cannot be completed before the deadline associated with the second GPU task, to interrupt the execution of the first GPU task and execute the second GPU task.

14. The GPU according to claim 11, wherein the microcontroller is configured to allow the first GPU task to continue execution by allowing execution of the first task to complete.

15. The GPU according to claim 11, wherein the microcontroller is configured to estimate a completion time for each of the first and second GPU tasks, by, for each GPU task:
   identifying one or more workload characteristics of the GPU task;
   accessing stored statistics for each identified workload characteristic; and
   generating an estimated completion time for the GPU task using the stored statistics for identified workload characteristics.

16. The GPU according to claim 11, wherein the microcontroller is further configured to determine the deadline associated with the second GPU task.

17. The GPU according to claim 16, wherein the deadline associated with the second GPU task is determined based on a display refresh rate.

18. The GPU according to claim 11, wherein the microcontroller is further configured to update stored statistics associated with the first and/or second GPU task.

19. The GPU according to claim 11, wherein the first and second GPU tasks are graphics tasks.

20. A non-transitory computer readable storage medium having stored thereon an integrated circuit definition dataset that, when processed in an integrated circuit manufacturing system, configures the system to manufacture a GPU comprising a microcontroller, wherein the microcontroller is configured:
   whilst executing a first GPU task and in response to a second GPU task becoming ready to run, to determine which of the first and second GPU task has a higher priority; and
   in response to determining that the second GPU task has a higher priority than the currently executing first GPU task, to:
     estimate a completion time for each of the first and second GPU tasks;
     determine, using the estimated completion times, whether both the first and second GPU tasks can be completed before a deadline associated with the second GPU task;
     in response to determining that both the first and second GPU tasks can be completed before the deadline associated with the second GPU task, to allow the first GPU task to continue execution, and to set a timer to a time given by D−(E+C), wherein D is the deadline for the second GPU task, E is the estimated time to complete the second GPU task, and C is the time taken to perform a context switch from the first GPU task to the second GPU task; and
     in response to the timer expiring prior to completion of execution of the first GPU task, to interrupt the execution of the first GPU task and execute the second GPU task.

\* \* \* \* \*